United States Patent
Cheung et al.

(10) Patent No.: US 6,798,090 B2
(45) Date of Patent: Sep. 28, 2004

(54) ELECTRICAL POWER GENERATION BY COUPLED MAGNETS

(75) Inventors: Jeffrey T. Cheung, Thousand Oaks, CA (US); Hao Xin, Sherman Oaks, CA (US)

(73) Assignee: Rockwell Scientific Licensing, LLC, Thousand Oaks, CA (US)

(*) Notice: Subject to any disclaimer, the term of this patent is extended or adjusted under 35 U.S.C. 154(b) by 0 days.

(21) Appl. No.: 10/125,896

(22) Filed: Apr. 18, 2002

(65) Prior Publication Data

US 2003/0197433 A1 Oct. 23, 2003

(51) Int. Cl.[7] .............................................. H02K 35/00
(52) U.S. Cl. ......................... 310/17; 310/30; 290/1 R; 290/1 A; 322/3
(58) Field of Search ........................... 310/12, 13, 14, 310/15, 17, 30; 290/1 R, 42, 53, 1 A; 322/1, 3

(56) References Cited

U.S. PATENT DOCUMENTS

| | | | | |
|---|---|---|---|---|
| 3,066,203 A | * | 11/1962 | Ovskinsky | 335/103 |
| 3,083,469 A | | 4/1963 | Herbst | 33/215 |
| 3,554,617 A | | 1/1971 | Weaver | 308/3 |
| 4,260,901 A | | 4/1981 | Woodbridge | 290/42 |
| 4,732,706 A | | 3/1988 | Borduz et al. | 252/510 |
| 4,734,606 A | * | 3/1988 | Hajec | 310/90.5 |
| 4,814,654 A | * | 3/1989 | Gerfast | 310/154.28 |
| 4,965,864 A | | 10/1990 | Roth et al. | 318/135 |
| 5,347,186 A | | 9/1994 | Konotchick | 310/17 |
| 5,358,648 A | | 10/1994 | Chakravarti | 252/8.6 |
| 5,376,862 A | | 12/1994 | Stevens | 310/75 |
| 5,452,520 A | | 9/1995 | Raj et al. | 33/366 |
| 5,578,877 A | * | 11/1996 | Tiemann | 310/15 |
| 5,650,681 A | * | 7/1997 | DeLerno | 310/164 |
| 5,713,670 A | * | 2/1998 | Goldowsky | 384/115 |
| 5,775,169 A | * | 7/1998 | Solomon et al. | 74/490.01 |
| 5,818,132 A | * | 10/1998 | Konotchick | 310/17 |
| 5,908,987 A | * | 6/1999 | Raj | 73/514.09 |
| 6,083,082 A | * | 7/2000 | Saldana | 451/5 |
| 6,220,719 B1 | | 4/2001 | Vetorino et al. | 362/192 |
| 6,254,781 B1 | | 7/2001 | Raj | 210/695 |
| 6,313,551 B1 | * | 11/2001 | Hazelton | 310/12 |
| 6,501,357 B2 | * | 12/2002 | Petro | 335/229 |
| 6,570,273 B2 | * | 5/2003 | Hazelton | 310/12 |

FOREIGN PATENT DOCUMENTS

| | | | | |
|---|---|---|---|---|
| DE | 3841011 A | | 6/1990 | H02K/51/00 |
| DE | 19810211 A1 | * | 9/1999 | |
| DE | 19810211 A | | 9/1999 | H02K/41/02 |
| DE | 2011395 U1 | | 1/2002 | H04M/1/21 |
| EP | 206516 A2 | | 12/1986 | H01F/1/28 |
| FR | 2407599 A | | 5/1979 | H02K/35/02 |
| GB | 1504872 A | | 3/1978 | F16C/29/02 |
| JP | 2001258234 A | | 9/2001 | H02K/35/04 |

OTHER PUBLICATIONS

Calin Popa N et al: "Gravitational electrical generator on magnetic fluid cushion", Journal of Magnetism and Magnetic Materials, Elsevier Science Publishers, Amsterdam, NL, vol. 201, NR. 1–3, Pages(s) 407–409 XP004181287, ISSN: 0304-8853, p. 408, col. 1, line 1–3; figures 1,2 Received May 25, 1998; received in revised form Sep. 21, 1998.

(List continued on next page.)

Primary Examiner—Thanh Lam
Assistant Examiner—Judson H. Jones
(74) Attorney, Agent, or Firm—Koppel, Jacobs, Patrick & Heybl

(57) ABSTRACT

An electrical generator has a plurality of spaced magnets that move together relative to at least one coil to generate an electrical signal in the coils. Equal numbers of magnets and coils, with equal lengths and spacings between them, are preferably employed. Significant enhancements in power output are achieved by orienting successive magnets in magnetic opposition to each other, so that the magnetic fields from successive magnets along the axis of movement substantially cancel each other at locations between the magnets.

53 Claims, 7 Drawing Sheets

OTHER PUBLICATIONS

Patent Abstracts of Japan, vol. 2000, No. 26, Jul. 1, 2002 –& JP 2001 258234 A (NTT ME Kansai Corp), Sep. 21, 2001 abstract, 'Inertial Generation Equipment and Communication System', Kurokawa Naoyuki.

Patent Abstracts of Japan, vol. 013, No. 014 (M–784), Jan. 13, 1989, –& JP 63 225718 A (Hitachi Electronics Eng Co Ltd), Sep. 20, 1988 abstract.

Electronic Motors and Motor Controls; Jeff Keljik, 1995, Delmar Publishers; pp. 139–142 month unknown.

Patent Abstracts of Japan, vol. 002, No. 044 (M–013), Mar. 24, 1978, –&JP 53 002865 A (Inque Japax Res Inc), Jan. 12, 1978 fig. 1.

Patent Abstracts of Japan, vol. 007, No. 012 (M–186), Jan. 19, 1983, –& JP 57 171117 A (Fuji Xerox KK), Oct. 21, 1982 abstract.

* cited by examiner

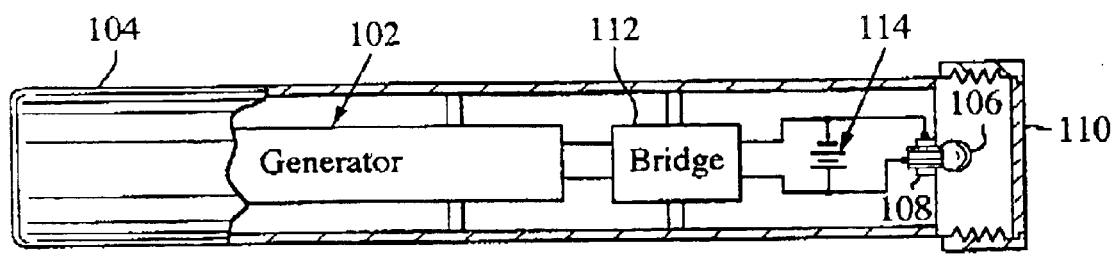
Fig.12
Fig.13
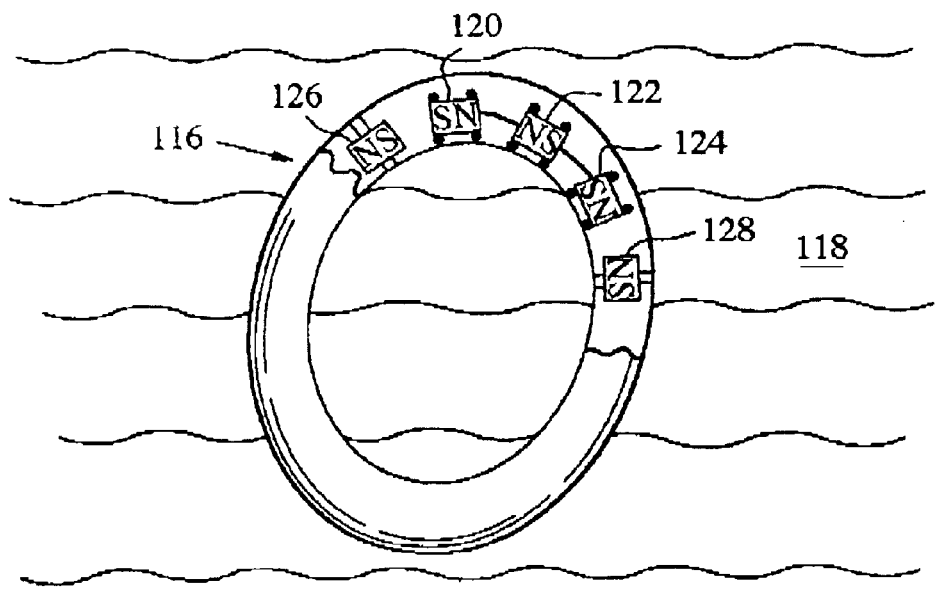
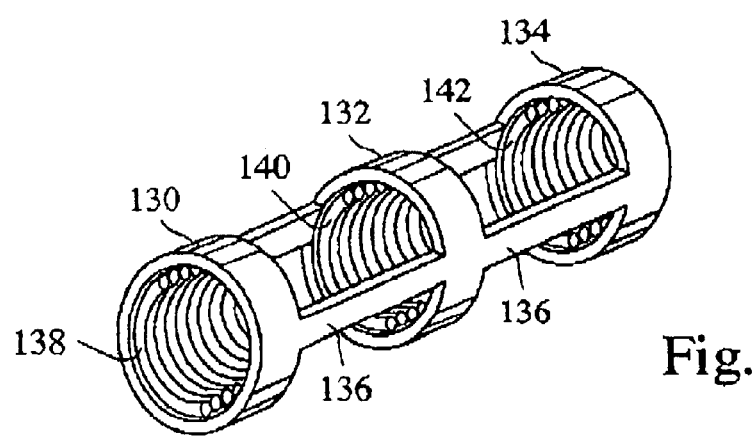
Fig. 14

ELECTRICAL POWER GENERATION BY COUPLED MAGNETS

BACKGROUND OF THE INVENTION

1. Field of the Invention

This invention relates to electrical power generation by moving magnets.

2. Description of the Related Art

Moving a magnet through a conductive coil induces an electromotive force that generates a current in the coil. If the magnet is moved back and forth in a reciprocating motion, the direction of current flow in the coil will be reversed for each successive traverse, yielding an AC current.

Several electrical generating systems have been developed that make use of reciprocating magnet movement through one or more coils. For example, in U.S. Pat. No. 4,260,901, wave motion in a body of water causes a float to move up and down, which in turn imparts a reciprocating motion to a magnet that travels between a pair of coils stationed at opposite ends of its path. In U.S. Pat. No. 5,347,186, a rare earth magnet and a coil are positioned to move back and forth relative to each other. The magnet can either be fixed and the coil moved up and down relative to the magnet, as by wave action, the coil fixed and the magnet moved relative to the coil as by pneumatic pressure, or the coil housing shaken or vibrated, as by being carried by a jogger, to cause a reciprocating motion of the magnet which moves with the coil. In FIG. 10A of this patent, a pair of magnets in polar opposition to each other are connected to opposite sides of the pendulum arm of a tilt buoy, with a respective coil located beyond each magnet when the buoy is vertical. In response to wave action tilting the buoy back and forth, the arm pivots relative to the buoy so that the magnets alternately enter and exit the opposed coils, generating electric currents in the coils as they do so. Each magnet moves through only one respective coil.

In U.S. Pat. No. 5,818,132, a moving magnet is confined to a bi-directional linear or near-linear motion through each of at least two mutually spaced coils for providing power in applications such as long-life flashlights, alarm systems, communication devices located at places where conventional electric power sources are unavailable, and for relatively high power repetitive forces such as the forces on the heel of a shoe during walking or running. FIG. 11B of this patent is similar to FIG. 10A of U.S. Pat. No. 5,347,186; the inventor of both patents is the same. In FIG. 15 of this patent, three moving magnets are suspended in a tube by polar opposition to both each other and to end magnets, with a number of coils spaced along the outside of the tube. Each of the coils has a pair of outputs which go to a circuit that combines the coil outputs to produce a net DC output. The magnets are not connected to each other, but are kept apart by their polar opposition.

In general, an electric signal is generated in response to a changing magnetic field within a coil (taken perpendicular to the coil axis). The traditional reciprocating magnet generator is inefficient because, as realized by the present inventors, the highest magnetic field gradient is located by the end of the magnet, with only a small or zero gradient at its middle, so significant electrical generation occurs in only a relatively small portion of the coil as the magnet passes through. Furthermore, the portion of the coil which experiences little or no magnetic field gradient at any given time still contributes to the coil's overall ohmic loss. Thus, much of the energy that goes into moving the magnet relative to the coil fails to produce a useful electric output.

SUMMARY OF THE INVENTION

The present invention seeks to provide a new electrical generator system and method which allows a much greater portion of the moving magnet energy to be converted to electrical power. This is accomplished by constraining a plurality of spaced magnets to move together relative to at least one coil, and preferably a plurality of coils, so that alternating increasing and decreasing magnetic fields are established to generate electric signals in the coils.

In a particular embodiment equal numbers of magnets and coils, having substantially equal lengths and spacings along a common axis, are employed. If the magnets are oriented in magnetic opposition to each other and generate similar fields, the component of the fields parallel to the axis will cancel at locations between successive magnets, thereby producing large magnetic field differentials as the magnets move relative to the coils and a consequent high voltage output. The outputs from the individual coils can be combined to produce a net generator output.

The magnets can be arranged for various types of motion, such as a reciprocating linear movement. To provide an ultra low friction interface between the magnets and an associated support structure, a ferrofluid or other lubricant having a static coefficient of friction less than 0.01 and a viscosity less than 10 centipoise can be used.

The electrical generator can be used to power various types of operating systems, such as battery chargers, cellular telephones, environmental sensors, signal transmitters and flashlights. The operating systems can be battery operated, with the generator charging the battery, or they can be operated by the generator in real time.

These and other features and advantages of the invention will be apparent to those skilled in the art from the following detailed description of particular embodiments, taken together with the accompanying drawings.

BRIEF DESCRIPTION OF THE DRAWINGS

FIGS. 11–13 are broken-away views of a cellular telephone, flashlight and floatation device all powered in accordance with the invention; and FIG. 14 is a sectional view of an alternate embodiment of the invention with magnets surrounding coils.

DETAILED DESCRIPTION OF THE INVENTION

Figure 1:
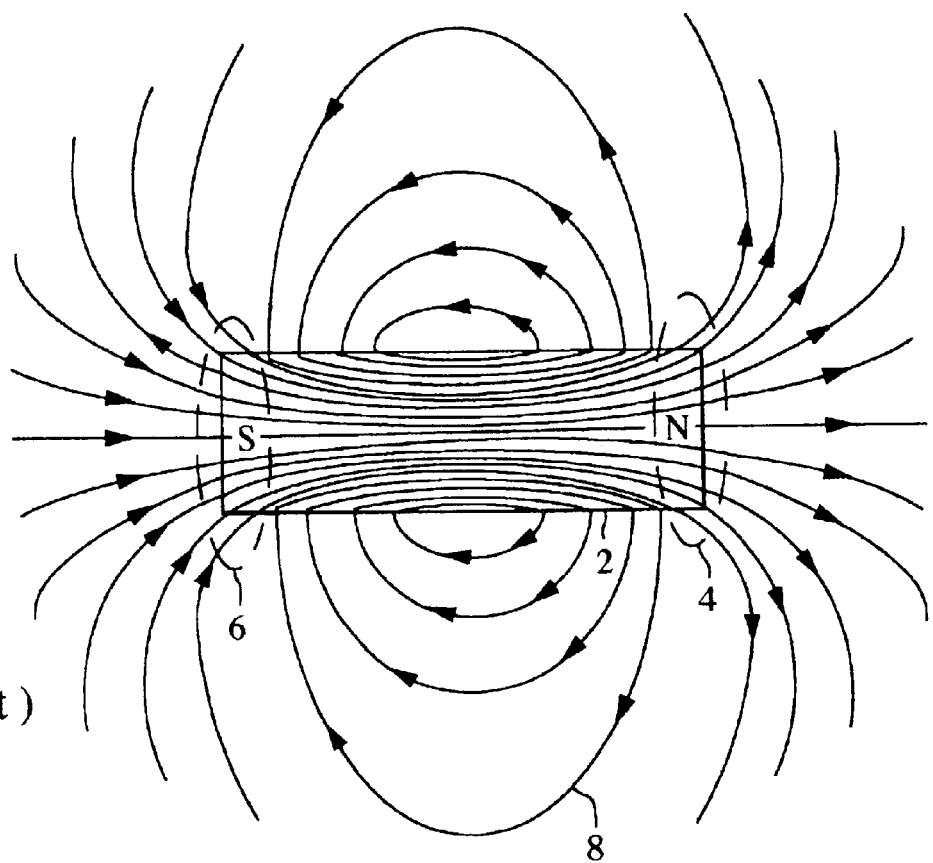
FIG. 1 is a plan view of a conventional permanent magnet, illustrating its associated magnetic field line.

A conventional permanent magnet 2 is illustrated in FIG. 1, with north and south poles designated N and S, respectively. The magnet generates a magnetic field that has a maximum density external to the magnet in the areas 4 and 6 adjacent to the poles, as indicated by the magnetic field lines 8 shown in the drawing. For purposes of electrical generation with a linear generator having a magnet movement parallel to the magnet axis, the operative portion of the magnetic field is the component parallel to the magnet's axis.

Figure 3:
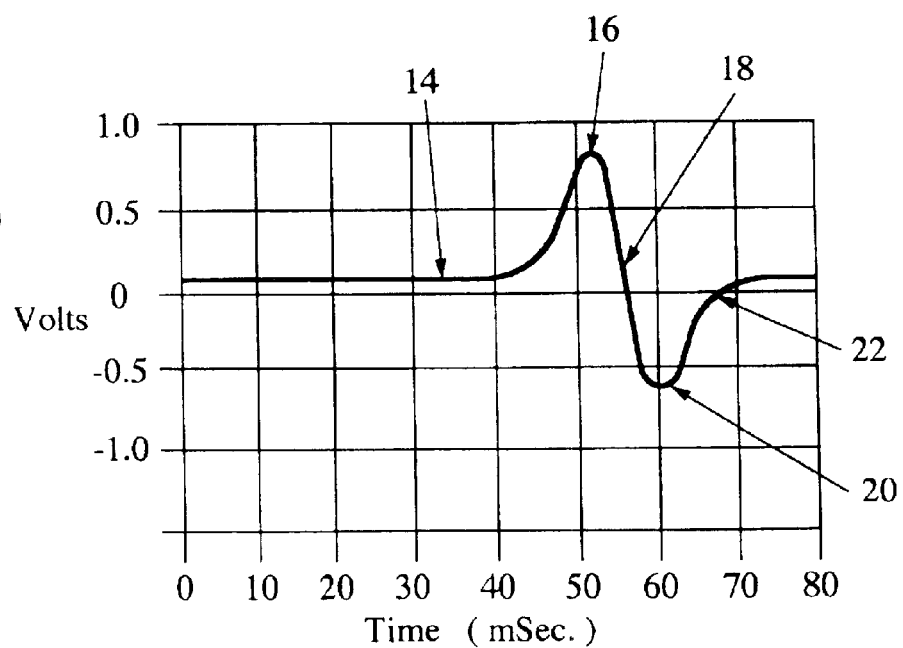
FIG. 3 is a graph illustrating a voltage output produced from the magnet movement of FIGS. 2a–2e.

FIGS. 2a–2e together with FIG. 3 illustrate the generation of an electrical signal in a coil 10 through which a magnet 12 passes. As the magnet passes through it induces a voltage in the coil to generate a current when the coil circuit is closed. The induced voltage is proportional to the rate of change of the total magnetic flux in the axial direction through the coil; the total axial magnetic flux can be calculated by integrating the product of the directional magnetic field and the area encompassed by the coil over the length of the coil.

Figure 2A:
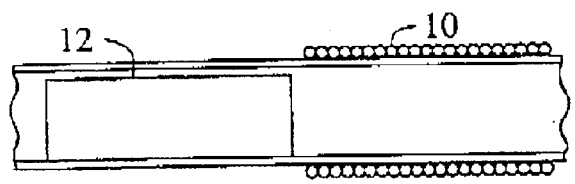
FIGS. 2a, 2b, 2c, 2d and 2e are simplified sectional views showing sequential stages in the movement of a magnet through a coil.

In FIG. 2a the magnet 12 is shown outside and to the left of the coil 10, at a position where the right-most portion of its magnetic field just begins to enter the coil. This corresponds to area 14 in FIG. 3, which traces the voltage in the coil as the magnet passes through it. At this point little or no voltage is generated.

Figure 2B:
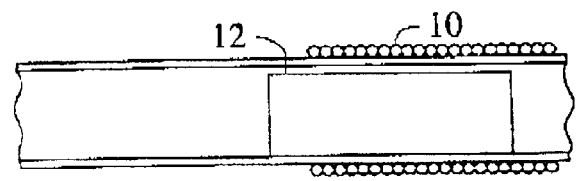
Figure 2C:
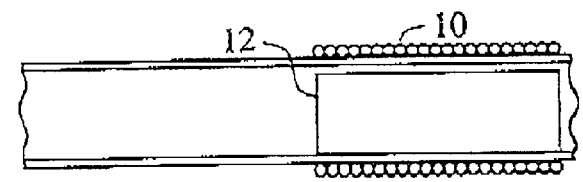
Figure 2D:
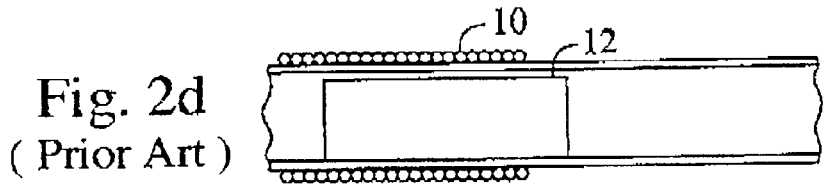
Figure 2E:
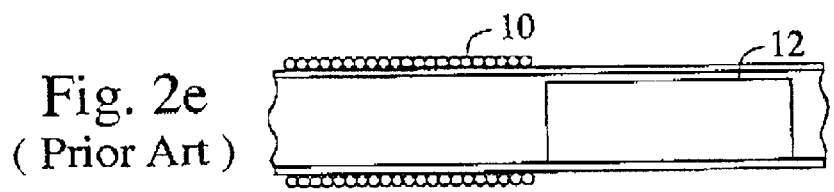

In FIG. 2b the magnet has moved to the right to a position partially within but still partially outside the coil. As the magnet moves to this position, the net axial magnetic flux vector within the coil changes to induce a voltage, which reaches a maximum (16 in FIG. 3) at the location of maximum rate of flux increase. Thereafter, as the magnet continues moving to the right to the centered position within the coil shown in FIG. 2c, the generated voltage drops to zero (location 18 in FIG. 3) as the rate of flux change within the coil at the opposite ends of the magnet cancel each other. The generated voltage continues to drop to a negative minimum 20 as the magnet continues moving to the right to a position such as that illustrated in FIG. 2d, partially within and partially outside and to the right of the coil. This position corresponds to a maximum rate of flux change in a vector direction opposite to that corresponding to FIG. 2b. Finally, as the magnet exits the coil to the right and continues moving away to the position shown in FIG. 2e, the generated voltage returns to zero (22 in FIG. 3) when the magnetic flux is totally removed from the coil.

The output power P from this type of linear generator follows the relationship $P=V^2/R$, where V is the induced voltage and R is the coil resistance. However, the described generator is relatively inefficient. This is because the portion of the coil over any magnet section that does not produce a significant axial differential in the magnetic flux does not contribute significantly to the induced voltage, but still contributes to the coil's ohmic loss, and also because the same power input is required to move this section of the magnet as another section of equal weight that does have a significant magnetic flux differential.

Figure 4A:
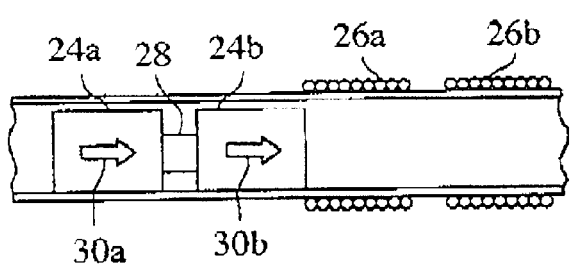
FIGS. 4a, 4b and 4c are sectional views illustrating the sequential movement of a pair of magnets coupled together with a common magnetic polarization, and moving through a pair of coils in accordance with the invention.
Figure 4B:
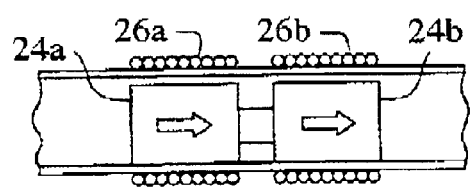
Figure 4C:
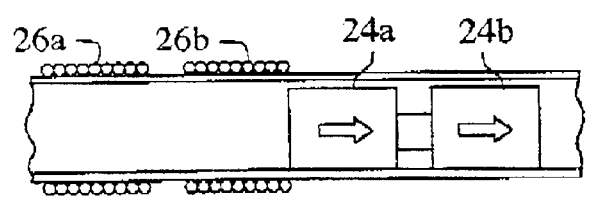

Applicants address this problem by coupling multiple magnets together and moving them in tandem through multiple coils, thereby increasing the net magnetic flux differential over time parallel to the magnet movement. One implementation of this new approach is illustrated in FIGS. 4a–4c. Only two magnets and two coils are illustrated in this example for purposes of simplification, but normally larger numbers would be desired, the principal constraint being space limitations. In FIG. 4a a pair of magnets 24a and 24b, each half the length of the single magnet 12 in FIGS. 2a–2e, are shown beginning to move through two coils 26a and 26b, each of which has half as many turns and half the length of the single coil 10 in FIGS. 2a–2e. Magnets 24a and 24b are held together, such as by a nonmagnetic rod 28 with the two magnets glued at its opposite ends; numerous other mechanical couplings could be employed. The magnets and coils are preferably of equal length and separated by equal gaps. If desired unequal lengths and/or spacings could be used, although this would degrade the overall output if the individual coil outputs are summed and their induced voltages are not in phase with each other.

The two magnets 24a, 24b are shown with a common polarization orientation, with north at their right ends and south at their left ends as indicated by polarization arrows 30a and 30b. The magnets are shown in FIG. 4a to the left of coils 26a, 26b, where they are just beginning to induce a voltage at a centered position with the two magnets aligned with respective coils in FIG. 4b, and at a position outside and to the right of both coils where the generated voltage relaxes to zero in FIG. 4c.

Figure 5:
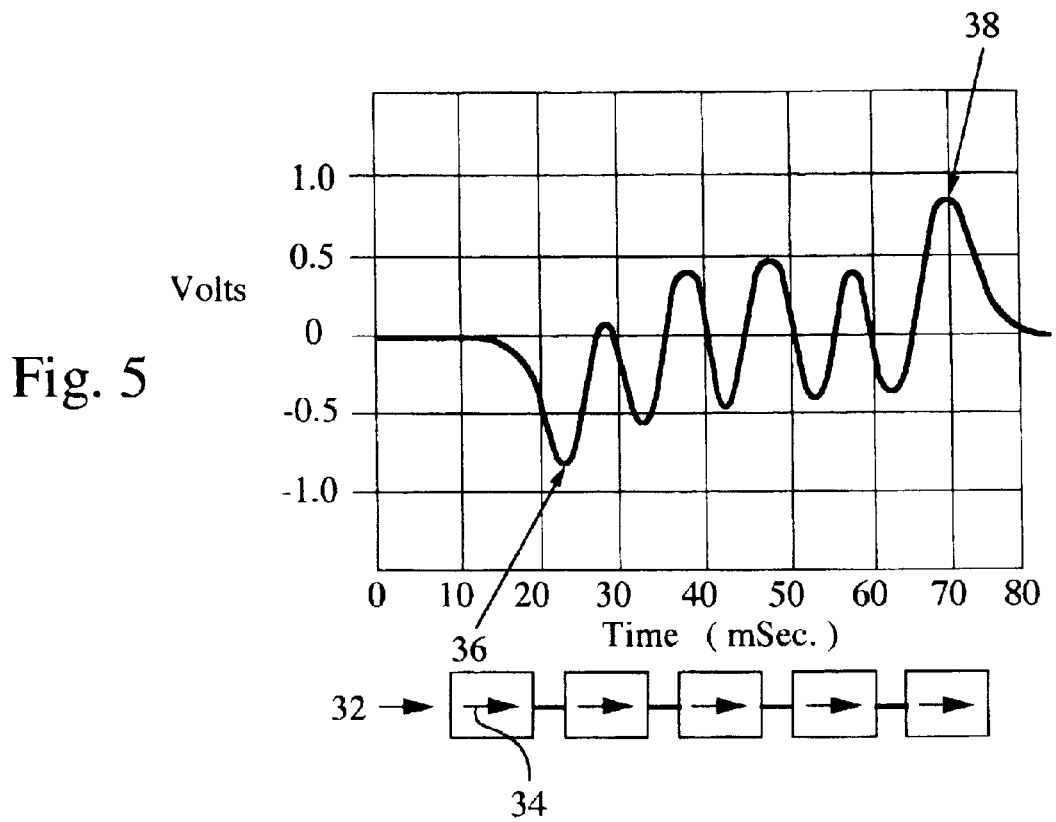
FIG. 5 is a graph illustrating a voltage output produced by the magnet movement of FIGS. 4a–4c.

FIG. 5 shows the voltage induced in a coil through which five spaced and coupled magnets, having a common polarization orientation, pass. To plot FIG. 3 a single ceramic magnet 2.54 cm in diameter and 2.79 cm long, with a magnetic strength of about 975 Gauss at the magnet, was used with a 4.45 cm diameter coil; to obtain the plot of FIG. 5 similar individual magnets and a similar coil where used, with a gap of 2.54 cm between successive magnets. The five magnets with common polarity orientations are indicated schematically by the five boxes 32 below the graph, with respective magnetic polarization arrows 34 all pointing in the same direction.

The five coupled magnets produced five positive and five negative alternating peak voltages as they passed through the coil, with the absolute values of the end voltages 36 and 38 comparable to the peak obtained in FIG. 3, and the intermediate peaks of lesser absolute values.

It is believed that the overall power output was hampered due to the presence of remnant magnetic flux inside the coil even when one of the magnets had moved beyond it. This resulted from the successive magnets having a common polarization vector, so that along the axis between the magnets the flux entering the south end of one magnet was in the same direction as the flux leaving the north end of the next magnet. Since the magnetic flux component parallel to the axis from the two magnets was additive in this area, a non-zero magnetic flux was produced along the axis between the magnets that reduced the overall flux differential as the magnets passed through the coils, and thus limited the voltage that could be induced.

Figure 6A:
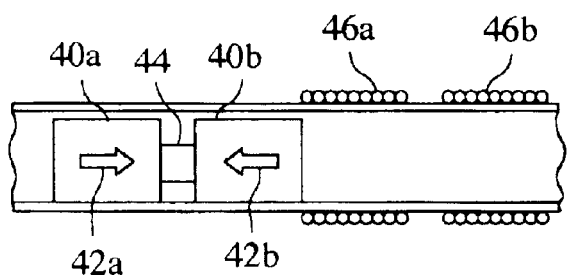
FIGS. 6a, 6b and 6c are sectional views illustrating the sequential movement of a pair of magnets coupled together in magnetic opposition to each other, and moving through a pair of coils.
Figure 6B:
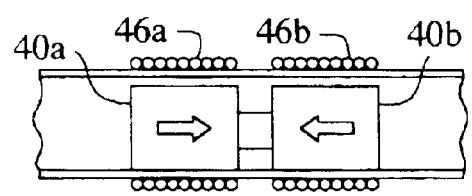
Figure 6C:
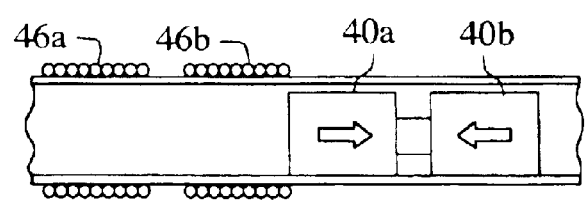

This limitation is overcome in accordance with another embodiment of the invention by orienting successive magnets in magnetic opposition to each other, with opposed directions of polarization. Such a system is illustrated in FIGS. 6a–6c, again for the simplified case of only two magnets and two coils. The magnets 40a, 40b in these figures are similar to the magnets 24a, 24b of FIGS. 4a–4c, but have opposed magnetic orientations as indicated by opposed polarity arrows 42a, 42b. As before, the magnets are coupled to move in tandem by a nonmagnetic rod 44 glued to the two magnets at its opposite ends, or other convenient coupling mechanism. A pair of coils 46a, 46b comparable to the coils 26a, 26b of FIGS. 4a–4c are provided, again preferably with lengths and a mutual spacing equal to those of the magnets. The movement of the coupled magnets progressively through the coils from one end to the other is illustrated in FIGS. 6a–6c.

Figure 7A:
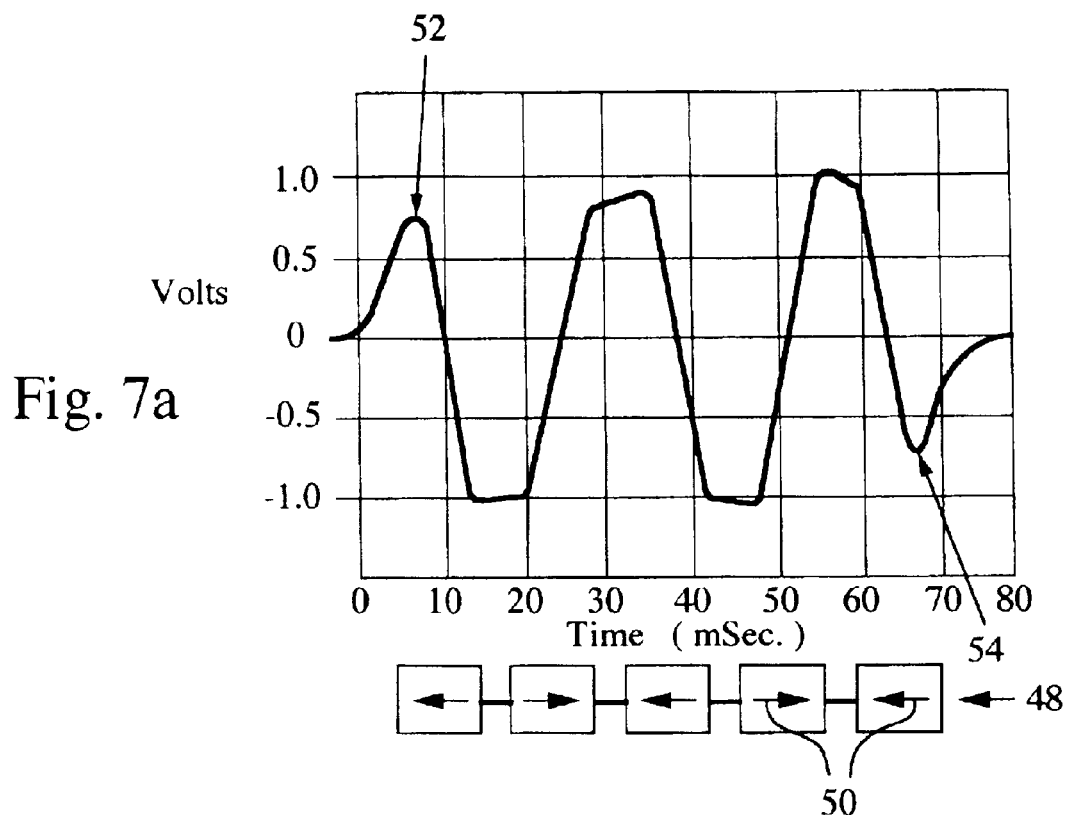
FIGS. 7a and 7b are graphs illustrating a voltage output produced by the magnet movement of FIGS. 6a–6c, for two different spacings between magnets and coils.

FIG. 7a is a trace of the voltage generated with a five magnet system similar to that used to generate the trace of FIG. 5, but with the five magnets in successive magnetic opposition to each other as indicated by the magnet symbols 48 with oppositely directed successive polarization vectors 50. Rather than the five positive and the five negative peak voltages obtained when the magnetic orientations were all in the same direction, only three positive and three negative voltage peaks were realized. The left and right end voltage peaks 52 and 54 were comparable in magnitude to the maximum end voltage peaks with the FIG. 5 system common of magnetic orientations. However, the intermediate peaks exhibited greater voltage levels, not lesser as in FIG. 5. This is believed to result from the axial magnetic flux between successive magnets being "reset" to essentially zero because of the opposite polarizations, producing a greater flux differential as the magnets pass through the coil than with a common magnetic orientation system in which a residual flux remain between magnets. The two end peaks 52 and 54 correspond to the lead magnet entering the first coil and the trailing magnet exiting the final coil, while the four intermediate peaks result from the four flux reset locations between the five successive magnets. While the values of the maximum voltages for the system of FIG. 7a exceed the maximum voltages for the systems of FIGS. 3 and 5 by modest amounts, the dependence of output power upon the square of the voltage results in a significantly greater output power.

Figure 7B:
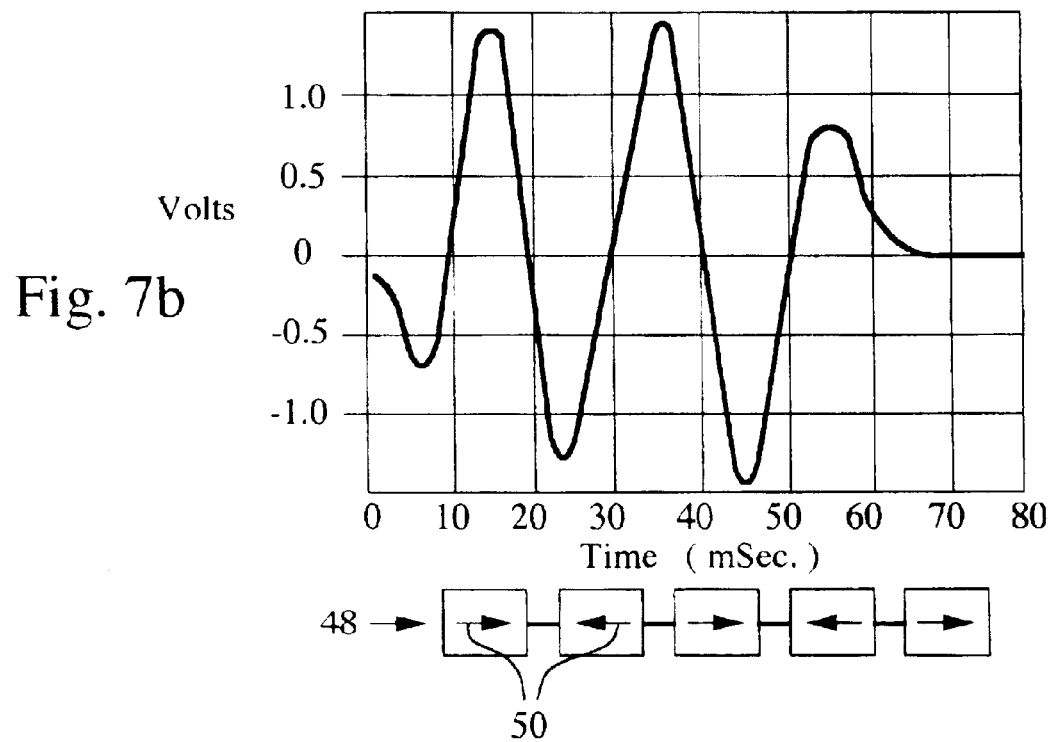

FIG. 7b shows the voltage output obtained for the same system as FIG. 7a, but with the gap between successive magnets reduced by half to 1.27 cm. Even greater voltage levels, with a correspondingly higher power output, were obtained.

Figure 8:
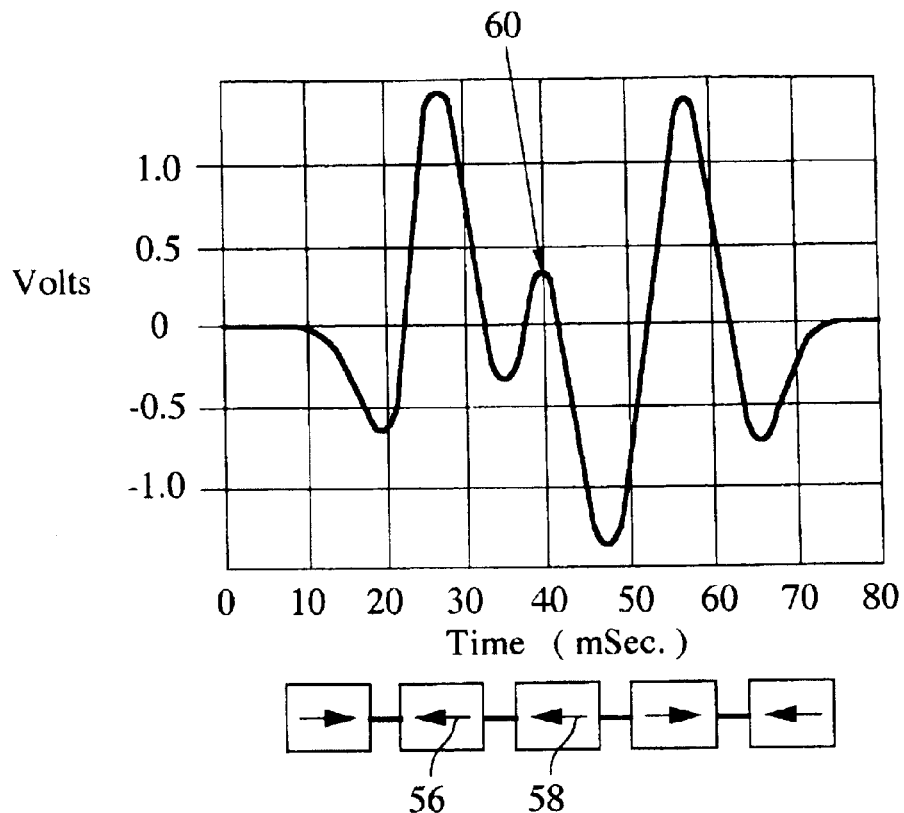
FIG. 8 is a graph illustrating the voltage output produced by the movement of five magnets, with a mixed common polarization and magnetic opposition, through a corresponding number of coils.

The added benefit of arranging successive magnets in magnetic opposition to each other is dramatically illustrated in FIG. 8, which shows the voltage output achieved with the same system as for FIG. 7b, but with two of the successive magnets 56 and 58 having a common rather than an opposed polarity vector. Results comparable to those for FIG. 7b were obtained, except for the intermediate peak 60 corresponding to the area between the two common polarization magnets, which had a markedly reduced value.

Figure 9:
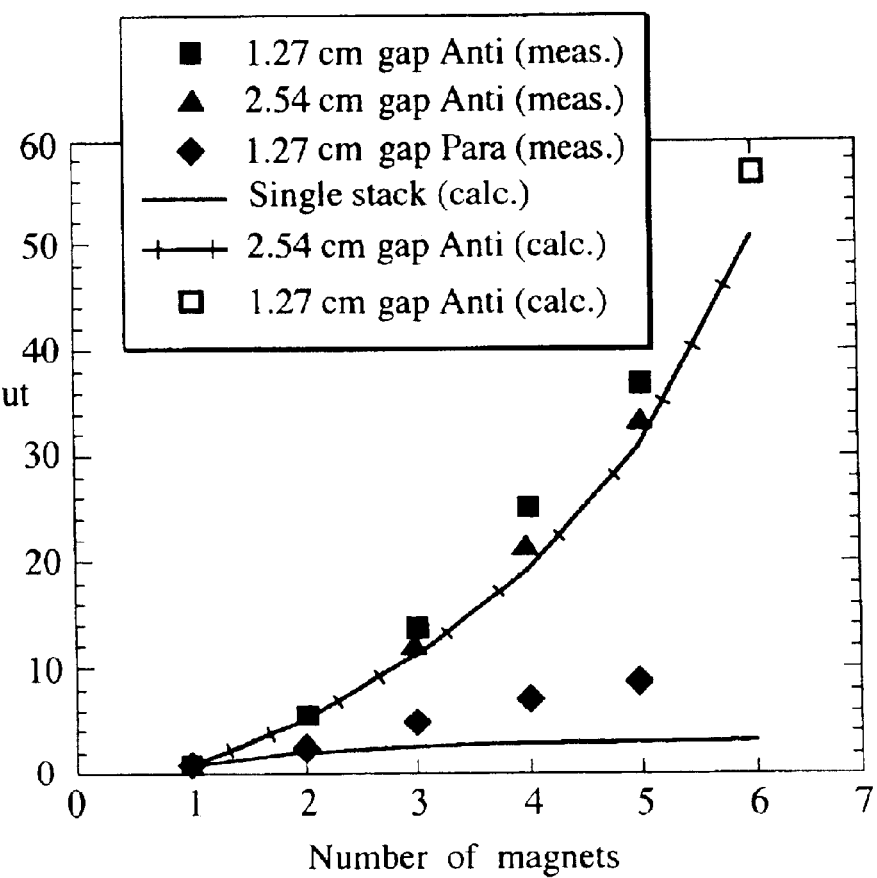
FIG. 9 is a graph illustrating the relative power output produced by a number of different moving magnet configurations, as a function of the number of magnets employed.

The benefits obtainable as a result of both opposed magnetization polarities and larger numbers of magnets moving in tandem are illustrated in FIG. 9, in which the relative power output is plotted as a function of the number of magnets for various systems. Each system employed equal numbers of magnets and coils of the same type as in FIGS. 3, 5, 7a, 7b and 8. Some of the results were measured (meas.) and others calculated (calc.). As indicated in the figure, both 1.27 cm and 2.54 cm gaps between magnets and coils were employed for magnets with opposing (anti) magnetic polarizations, and compared to a system with a common or parallel (para) magnet orientation, and also a "single stack" in which the same number of magnets were used with a common orientation and no gap between them. Using the power output of a single magnet and single coil as a base, relative power outputs of about 37 and 33 were measured for opposed magnetization systems with five magnets and gaps of 1.27 cm and 2.54 cm, respectively, while relative power outputs of about 57 and 51 were calculated for the same systems but with six magnets each. Thus, the addition of extra magnets and coils in a system with opposed polarizations was found to increase the power output far beyond the added amount of hardware.

Figure 10:
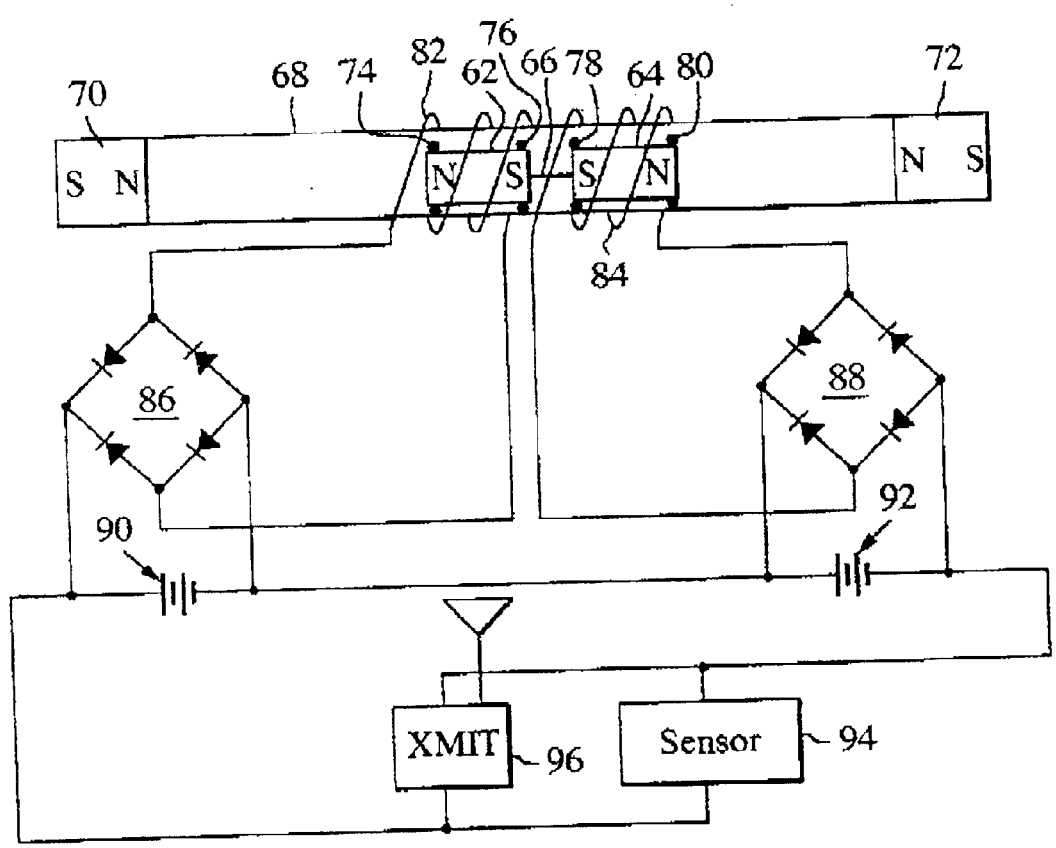
FIG. 10 is a schematic diagram of an environmental sensor/transmitter with a battery charger powered by a generator in accordance with the invention.

The invention has a large number of applications and can be used by moving the magnets relative to static coils, moving the coils relative to static magnets, or both. A reciprocating system of the latter type is illustrated in FIG. 10 as a battery powered environmental sensor with a remote transmitting capability. A pair of permanent magnets 62 and 64 are coupled to each other by a magnetic rod 66 to move in tandem, with the magnets oriented in magnetic opposition to each other. The magnets are housed within a nonmagnetic support structure 68, illustrated as a hollow tube with end magnets 70 and 72 at opposite ends of the tube in axial polar opposition to adjacent moveable magnets 62 and 64, respectively. The ends of the moving and end magnets which face each other are of like magnetic polarity so that the kinetic energy of a moving magnet is converted to potential energy as it approaches an end magnet, and then back to kinetic energy as it is repelled away from the end magnet. The magnets preferably move along the tube with the aid of a lubricant such as a ferrofluid. Ferrofluids are dispersions of finely divided magnetic or magnetizable particles dispersed in a liquid carrier. A summary of patents related to the preparation of ferrofluids is provided in U.S. Pat. No. 6,056,889.

A ferrofluid within the tube enclosure is naturally attracted to the poles of magnets 62 and 64 to form beads 74, 76 and 78, 80 around the end poles of the respective magnets. This provides an ultra low friction lubricant that allows the magnets 62, 64 to freely move within the tube in response to either a tilting of the tube away from horizontal, or a horizontal tube movement.

A pair of conductive coils 82, 84, typically copper, are wound around the tube and spaced apart by the same distance as the magnets 62, 64. Movement of the magnets relative to the tube generates currents in the coils, as explained previously. The coupled magnets 62, 64 reciprocate back and forth between the end magnets 70, 72, generating AC currents in the coils 82, 84. In the embodiment illustrated in FIG. 10, the currents and coils 82 and 84 are rectified by bridge rectifiers 86 and 88, respectively, which charge respective batteries 90 and 92. The batteries are connected together to provide a power source for an environmental sensor 94 that can sense one or more environmental conditions such as temperature, pressure, gasses, radiation or the like. To establish the sensor at a remote location, a transmitter 96 can be provided to transmit information concerning the sensed condition, with the transmitter also operated off of batteries 90 and 92. Alternately, the sensor 94 and transmitter 96 can be operated in real time, directly from the output of coils 82 and 84 or bridge circuits 86 and 88, by eliminating the batteries 90 and 92.

Figure 11:
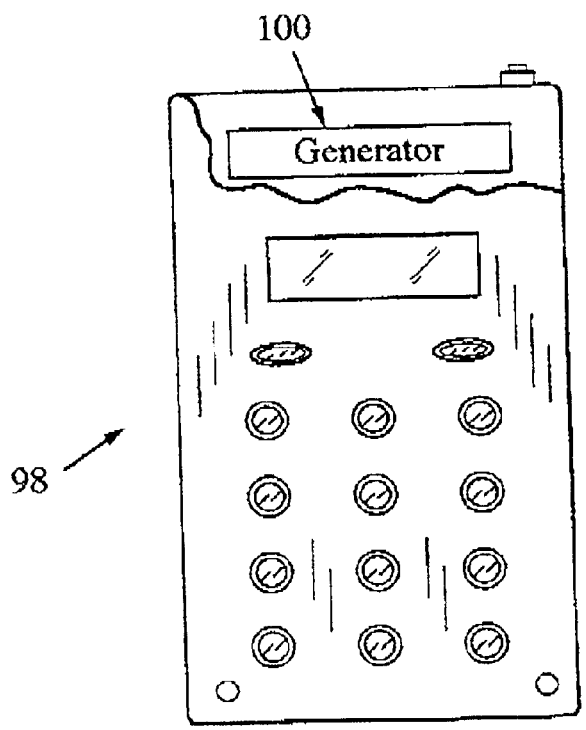

Applications of the invention to a cellular telephone, flashlight and floatation device are illustrated in FIGS. 11, 12 and 13, respectively. FIG. 11 shows a cellular telephone 98 that can be placed in a person's shirt pocket or belt clip. An electrical generator/battery charger 100 such as that illustrated in FIG. 10 is supported within the cell phone 98 so that it has a generally horizontal orientation when the phone is placed upright in the user's shirt pocket or held in a belt clip. Slight movements of the phone by normal activities such as walking or eating will cause the magnets within the generator to reciprocate back and forth, charging the internal battery to operate the phone.

FIG. 12 illustrates the invention as applied to a hand-held flashlight. An electrical generator 102, consisting of coupled magnets, coils and end magnets within a tube as described above, is provided within a flashlight housing 104, with an illuminating bulb 106 at one end held to a bulb contact 108 and emitting light through a transparent plate 110 that can be screwed off to access the bulb. As with the other embodiments described above, the generator 102 provides an AC output that is rectified by a bridge circuit 112 which charges a battery 114 connected in circuit with the bulb contact 108. Again, the battery can be eliminated if real time flashlight operation is desired, and in any application of the invention the bridge circuit can be eliminated if it is desired to operate directly from an AC signal.

The application of the invention to an electrical generator operated by wave action is illustrated in FIG. 13. This system is useful for powering an emergency transmitter, a repeater station for underwater cable, or other marine applications requiring an electrical power source that is not otherwise available. In the illustrated embodiment, the generator is provided in the form of a buoyant ring 116 which floats upon water 118. The ring is tubular and houses a plurality of magnets 120, 122, 124 that are coupled together to move in tandem, with successive magnets in polar opposition to each other. Optional end magnets 126, 128 can be provided, or the moveable magnets 120, 122, 124 can be allowed to travel freely around the ring without interruption. Coils, which are not shown for purposes of simplification, would be distributed along the moving magnet path, preferably with lengths and spacings matching those of the magnets. Associated rectifier circuits, batteries and operating systems (not shown) could also be provided, with an associated device operated by the electrical signals produced in response to magnet movement. The ring could also be suspended in air and operated by wind action.

Many different variations on the physical configuration of the generator are possible. For example, FIG. 14 illustrates a version in which the coupled magnets are disposed outside, rather than inside, the coils. A plurality of ring-shaped magnets 130, 132, 134 are coupled together by nonmagnetic struts 136 to move over corresponding coils 138, 140, 142, which are shown in section. The coils could be wound on the inside of a nonmagnetic mandrel over which the magnets slide, and connected together to provide an accumulated output.

A preferred ferrofluid lubricant for the present invention has a viscosity substantially less than 10 centipoise (cp), actually less than 2 cp, and achieves an ultra low coefficient of static friction in the range of 0.0008–0.0012. This and other suitable ferrofluid compositions are discussed in copending U.S. patent application Ser. No. 10/078,724 entitled "Electrical Generator with Ferrofluid Bearings", filed Feb. 19, 2002 by the present applicants and assigned to Innovative Technology Licensing, LLC, the assignee of the present invention. The contents of said application are hereby incorporated herein by reference.

The composition comprises a mixture of one part Ferrotec (USA) Corporation EFH1 light mineral oil ferrofluid, mixed with from 2 to 4 parts of isoparaffinic acid, stirred for 24 hours. Suitable sources of isoparaffinic acid are Isopar 6 and Isopar M hydrocarbon fluids from Exxon Mobil Chemical Corp. Undiluted EFH1 ferrofluid could also be used to achieve very low friction, as could other ferrofluids with static friction coefficients up to about 0.02, such as Ferrotec (USA) Corporation EMG 805, a water-based ferrofluid with a static friction coefficient of about 0.01 and a viscosity of about 5 cp.

While several embodiments of the invention have been shown and described, numerous variations and alternate embodiments will occur to those skilled in the art. It is accordingly intended that the invention be limited only in terms of the appended claims.

We claim:

1. An electrical generator, comprising:
   a plurality of spaced coils distributed along a common axis, and
   a plurality of spaced magnets coupled to each other to move together relative to said coils along a linear reciprocating path with at least some of said magnets moveable in magnetic proximity to a plurality of said coils, movement of said magnets relative to said coils along said linear reciprocating path generating electrical signals in said coils,
   wherein successive magnets along said axis are oriented in magnetic opposition to each other,
   said magnets being arranged to move relative to said coils inside said coils.

2. The electrical generator of claim 1, comprising equal numbers of said magnets and coils.

3. The electrical generator of claim 2, said magnets and coils having substantially equal lengths along said axis.

4. The electrical generator of claim 2, the spacings between said magnets being substantially equal to the spacings between said coils.

5. The electrical generator of claim 4, wherein the lengths of said coils are substantially equal to the lengths of said magnets.

6. The electrical generator of claim 1, said magnets generating similar magnetic fields so that the magnetic fields from successive magnets parallel to said axis substantially cancel each other at locations between said magnets.

7. The electrical generator of claim 1, said magnets comprising permanent magnets.

8. The electrical generator of claim 1, further comprising a support structure for said magnets, and a ferrofluid providing a low friction lubricant between said magnets and said support structure.

9. The electrical generator of claim 1, further comprising a support structure for said magnets, and a lubricant between said magnets and said support structure having a static coefficient of friction less than 0.01 and a viscosity less than 10 centipoise.

10. The electrical generator of claim 1, wherein said coils are connected so that their electrical signals are combined.

11. The electrical generator of claim 1, further comprising an operating system connected to be powered by said electrical signals.

12. The electrical generator of claim 11, said operating system comprising a battery charger, a cellular telephone, an environmental sensor, a signal transmitter or a flashlight.

13. The electrical generator of claim 11, wherein said operating system is battery operated, and said battery is connected to be recharged by said electrical signals.

14. The electrical generator of claim 11, wherein said coils are connected so that said electrical signals power said operating system in real time.

15. An electrical generator, comprising:
a plurality of spaced conductors distributed along a common axis, and
a plurality of spaced magnets coupled to each other to move together relative to said conductors along a linear reciprocating path with at least some of said magnets moveable in magnetic proximity to a plurality of said conductors, movement of said magnets relative to said conductors along said linear reciprocating path generating electrical signals in said conductors,
wherein successive magnets along said axis are oriented in magnetic opposition to each other,
said magnets being arranged to move relative to said coils outside said coils.

16. An electrical generator, comprising:
a plurality of spaced conductors distributed along a common axis,
a plurality of spaced magnets arranged for movement together relative to said conductors along said axis, with at least some of said magnets moveable in magnetic proximity to a plurality of said conductors, movement of said magnets relative to said conductors generating electrical signals in said conductors, and
a pair of end magnets aligned with said spaced magnets and in magnetic opposition to their respective nearest spaced magnets to limit the movement of said spaced mangets.

17. The electrical generator of claim 16, said conductors comprising coils.

18. The electrical generator of claim 17, comprising equal numbers of said magnets and coils.

19. The electrical generator of claim 18, said magnets and coils having substantially equal lengths along said axis.

20. The electrical generator of claim 18, the spacings between said magnets being substantially equal to the spacings between said coils.

21. The electrical generator of claim 16, said magnets generating similar magnetic fields so that the magnetic fields from successive magnets parallel to said axis substantially cancel each other at locations between said magnets.

22. The electrical generator of claim 16, wherein said axis is substantially linear.

23. The electrical generator of claim 22, wherein said magnets are arranged for a reciprocating linear motion relative to said conductors along said axis.

24. The electrical generator of claim 16, further comprising a support structure for said magnets, and a ferrofluid providing a low friction lubricant between said magnets and said support structure.

25. The electrical generator of claim 16, wherein said conductors are connected so that their electrical signals are combined.

26. The electrical generator of claim 16, further comprising an operating system connected to be powered by said electrical signals.

27. The electrical generator of claim 16, wherein successive ones of said spaced magnets along said axis are oriented in magnetic opposition to each other.

28. An electrical generator comprising:
at least one conductive coil,
a plurality of spaced magnets constrained to move together relative to said at least one coil so that alternating increasing and decreasing magnetic fields are established in said at least one coil to generate electric currents in said at least one coil as said magnets move relative to said at least one coil, and
a pair of end magnets aligned with said spaced magnets and in magnetic opposition to their respective nearest spaced magnet to limit the movement of said spaced magnets.

29. The electrical generator of claim 28, said at least one coil comprising a plurality of spaced coils.

30. The electrical generator of claim 29, wherein said coils and magnets are arranged along a common axis.

31. The electrical generator of claim 30, where the lengths of and spacings between said coils are substantially equal to the lengths of and spacings between said magnets.

32. The electrical generator of claim 29, wherein said coils are connected so that their electrical signals are combined.

33. The electrical generator of claim 28, said magnets generating similar magnetic fields so that the magnetic fields from successive magnets parallel to the direction of magnet movement substantially cancel each other at locations between said magnets.

34. The electrical generator of claim 28, further comprising a support structure for said magnets, and a ferrofluid providing a low friction lubricant between said magnets and said support structure.

35. The electrical generator of claim 28, further comprising an operating system connected to be powered by said electrical current.

36. The electrical generator of claim 28, wherein successive ones of said spaced magnets are oriented in magnetic opposition to each other.

37. An electrical generator, comprising:
a plurality of spaced conductors distributed along a common axis,
a magnet array comprising at least three spaced magnets arranged for movement together relative to said conductors along said axis, with at least some of said magnets moveable in magnetic proximity to a plurality of said conductors, movement of said magnets relative to said conductors generating electrical signals in said conductors, and
mechanical couplings between successive magnets of said array maintaining fixed spacings between them, with no direct mechanical couplings between the magnets that are part of the array and at the opposite ends of said array,
said magnets having respective magnetic polarizations parallel to said common axis.

38. The electrical generator of claim 37, wherein successive magnets of said array are oriented in mangetic opposition to each other.

39. The electrical generator of claim 37, said conductors comprising coils.

40. The electrical generator of claim 39, comprising equal numbers of said magnets and coils.

41. The electrical generator of claim 40, said magnets and coils having substantially equal lengths along said axis.

42. The electrical generator of claim 41, the spacings between said magnets being substantially equal to the spacings between said coils.

43. The electrical generator of claim 37, said magnets generating similar magnetic fields so that the magnetic fields from successive magnets parallel to said axis substantially cancel each other at locations between said magnets.

44. The electrical generator of claim 37, wherein said magnets are arranged for a reciprocating linear motion relative to said conductors along said axis.

45. The electrical generator of claim 37, further comprising a support structure for said magnets, and a ferrofluid providing a low friction lubricant btween said magnets and said support structure.

46. The electrical generator of claim 37, wherein said conductors are connected so that their electrical signals are combined.

47. The electrical generator of claim 37, further comprising an operating system connected to be powered by said electrical signals.

48. An electrical generator, comprising:

at least one conductive coil, a magnet array comprising at least three spaced magnets distributed along a common axis and constrained to move together relative to said at least one coil so that alternating increasing and decreasing magnetic fields are established in said at least one coil to generate electric currents in said at least one coil as said magnets move relative to said at least one coil, and mechanical couplings between successive magnets of said array maintaining fixed spacings between them, with no direct mechanical couplings between the magnets that are part of the array and at the opposite ends of said array, said magnets having respective magnetic polarizations parallel to said common axis.

49. The electrical generator of claim 48, wherein successive magnets of said array are oriented in magnetic opposition to each other.

50. The electrical generator of claim 48, said at least one coil comprising a plurality of spaced coils, wherein the lengths of and spacings between said coils are substantially equal to the lengths of and spacings between said magnets.

51. The electrical generator of claim 48, said magnets generating similar magnetic fields so that the magnetic fields from successive magnets parallel to the direction of magnet movement substantially cancel each other at locations between said magnets.

52. The electrical generator of claim 48, further comprising a support structure for said magnets, and a ferrofluid providing a low friction lubricant between said magnets and said support structure.

53. The electrical generator of claim 48, further comprising an operating system connected to be powered by said electrical current.

* * * * *